Oct. 14, 1969    M. B. WHITE    3,473,031
LASER TRANSMITTER FOR GENERATION OF SIMULTANEOUS FREQUENCY
MODULATED AND UNMODULATED BEAMS
Filed June 23, 1965
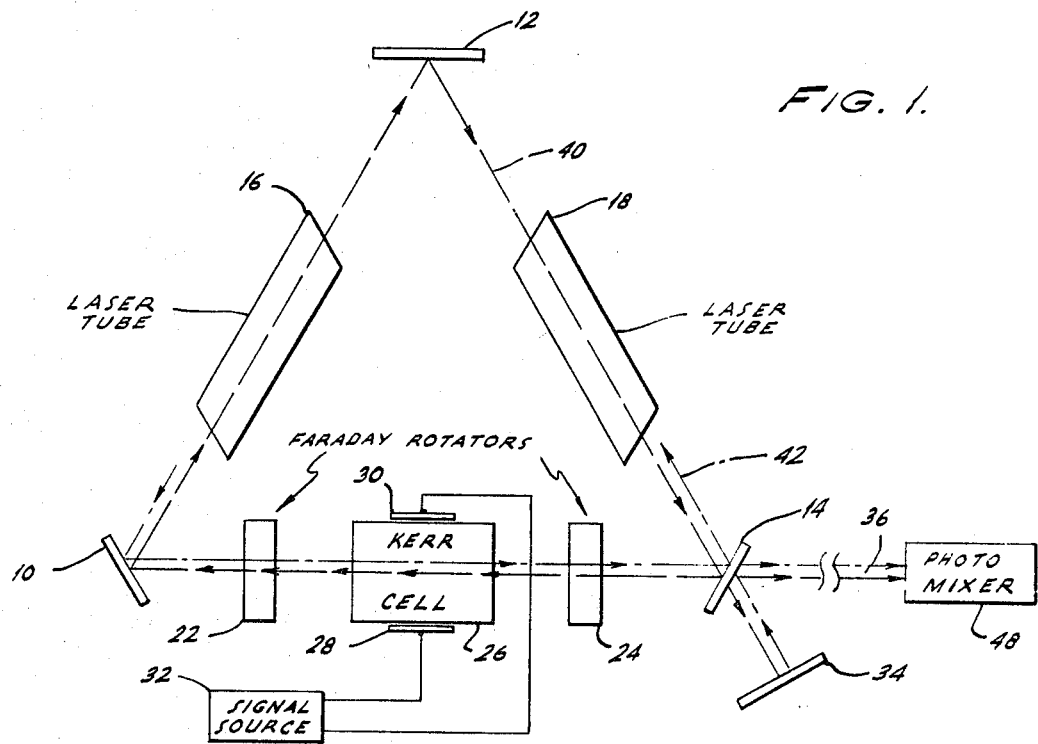
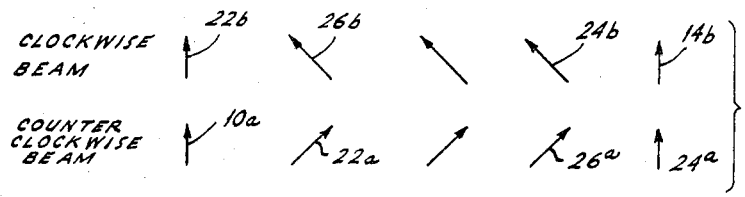
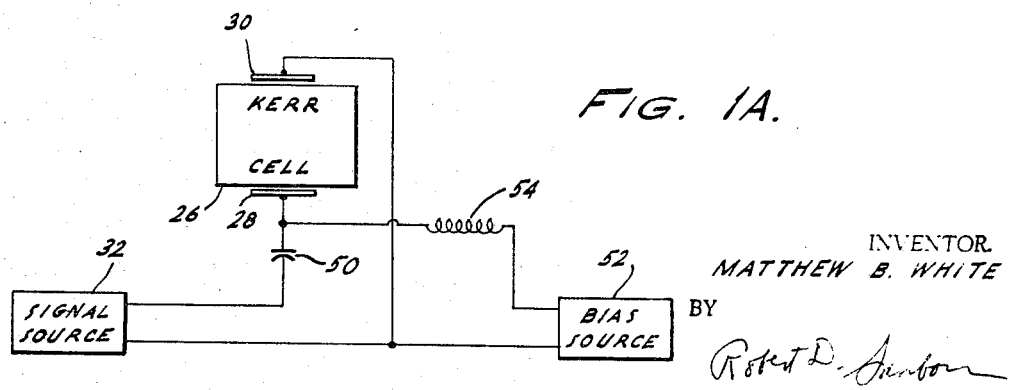
INVENTOR.
MATTHEW B. WHITE
BY
Robert D. _____
ATTORNEY United States Patent Office 3,473,031
Patented Oct. 14, 1969

3,473,031
LASER TRANSMITTER FOR GENERATION OF SIMULTANEOUS FREQUENCY MODULATED AND UNMODULATED BEAMS
Matthew B. White, Newport Beach, Calif., assignor to Philco-Ford Corporation, Philadelphia, Pa., a corporation of Delaware
Filed June 23, 1965, Ser. No. 466,389
Int. Cl. H04b 9/00
U.S. Cl. 250—199                      12 Claims

ABSTRACT OF THE DISCLOSURE

A laser device comprising a plurality of optical elements positioned to form a closed optical loop, a laser tube disposed in the loop which, upon energization, causes two contra-rotating beams to circulate in the loop, and two Faraday rotators and a Kerr cell disposed in the loop. The Faraday rotators and the Kerr cell cause the effective optical length of the loop for the beam rotating in one direction to be greater than the effective optical length of the loop for the beam rotating in the opposite direction. This causes the two beams to have different frequencies.

---

The present invention relates to laser communication systems and more particularly to an improved laser transmitter system capable of generating simultaneously a frequency modulated beam and a substantially coincident, substantially unmodulated beam.

Prior FM laser communication systems have suffered from various disadvantages such as large signal input power requirements, the necessity for manually movable reflectors, susceptibility to noise due to vibrations of the optical cavity, and difficulty of detection because of the high carrier frequency involved.

It is an object of the present invention to provide an improved laser communication FM transmitter which overcomes such disadvantages of prior art systems.

A further object is to provide an improved laser communication transmitter which provides a readily detectable signal with greatly reduced noise content.

Another object is to provide a laser communication transmitter which generates a frequency modulated beam and a substantially coincident, substantially unmodulated beam having a frequency bearing a relatively fixed relationship to the average frequency of the modulated beam.

A further object is to provide a laser communication transmitter which requires only a relatively small amplitude information signal to frequency modulate the laser beam.

These and other objects of the present invention which will appear as the description proceeds are achieved by providing a plurality of optical reflectors positioned to form a closed optical loop and disposing means in this loop to cause two contra-rotating beams to circulate in this loop, said means causing the effective optical length of the loop for the beam rotating in one direction to be greater than the effective optical length of the loop for the beam rotating in the opposite direction, thereby to cause the two contra-rotating beams to have different frequencies. The last-mentioned means has the further characteristic that it will change appreciably the effective optical length of the loop for signals traveling in one direction in response to an applied signal while leaving substantially unchanged the effective optical length of said loop for the signal traveling in the opposite direction around the optical loop.

In the preferred embodiment of the invention the means for establishing the two contra-rotating beams comprises one or more gaseous laser discharge tubes disposed in said loop. The means for altering the effective optical length of the loop comprises two Faraday rotators and a signal controlled electro-optic device, such as a Kerr cell or the equivalent, disposed between the two rotators.

For a better understanding of the present invention together with further objects thereof, reference should now be had to the following detailed description which is to be read in conjunction with the accompanying drawings in which:

FIG. 1 is a schematic diagram of a preferred embodiment of the present invention;
FIG. 1A shows a possible modification of a portion of the system of FIG. 1; and
FIG. 2 is a plot showing the polarization of the two contra-rotating beams as they pass through the beam modulating means of the present invention.

In FIGURE 1, three reflectors 10, 12 and 14 are positioned to define a triangular optical loop. Reflectors 10, 12 and 14 have been illustrated in FIG. 1 as first surfaced mirrors. However the term reflector as used throughout the specification and claims includes any suitable means for changing the direction of travel of the contra-rotating beams through fixed angles. Hence the term reflector embraces also second surfaced mirrors, prisms and the like.

Reflector 14 is preferably partially transmissive, for example 5% transmissive, in order to provide an exit path for energy circulating in said optical loop. Two laser tubes 16 and 18 are included in the optical loop. Each of the laser tubes may comprise any convenient type of laser device capable of supporting continuous wave oscillations at two spaced frequencies. For example, each of the laser devices may comprise a conventional He-Ne plasma tube with the usual radio frequency pumping source (not shown) associated therewith. The ends of the plasma tubes may be oriented at the Brewster angle to favor one plane of polarization of the circulating energy.

The beam modulating apparatus is located between reflectors 10 and 14 and comprises two 45° Faraday rotators 22 and 24 and a signal controlled electro-optic device 26 disposed therebetween. Device 26 is illustrated in FIGURE 1 as a Kerr cell but other known forms of electro-optic devices, such as a Pockels cell, may be substituted therefor. Two electrodes 28 and 30 are shown schematically in FIGURE 1. A signal source 32 has its output leads connected to electrodes 28 and 30. Source 32 provides the signal to be transmitted and may comprise a conventional power amplifier which is direct-coupled to the electrodes 28 and 30.

As will be explained in detail presently, the system thus far described causes two beams of slightly different frequency to rotate in opposite directions in the optical loop. Reflector 34, which is positioned at right angles to the direction of the path from reflector 12 to reflector 14 and outside the straight line extension of the path from reflector 10 to reflector 14, represents means for causing energy derived from the two contra-rotating beams to exit along parallel paths as shown at 36.

The system shown in FIGURE 1 operates as follows. The clockwise rotating beam, represented by the broken line 40, and the counterclockwise beam, represented by the dot-dash line 42, follow identical paths between the reflectors 10, 12, and 14. These beams have the same polarization in the paths between reflectors 10 and 12 and 12 and 14, this polarization being the one favored by the orientation of the exit windows of laser tubes 16 and 18. The polarization of the two beams at various points in the path between reflectors 10 and 14 is shown in FIGURE 2. The polarization of the counterclockwise beam as it leaves reflector 10 is shown at 10a. The plane of polarization of this beam is rotated 45° to the position shown by arrow 22a by the Faraday rotator 22. Kerr cell 26 is oriented so that its optical axis is parallel to the plane of polarization of the counterclockwise beam as it leaves rotator 22. The orientation of the counterclockwise beam as it leaves the Kerr cell 26 is shown at 26a in FIG. 2. The beam is restored to its original plane of polarization by rotator 24 as shown by arrow 24a.

The frequency of this counterclockwise beam will be determined by the effective length of the optical path defined by reflectors 10, 12 and 14, including the path through cell 26. The effective length of the path through the cell 26 will depend upon the amplitude of the voltage applied between terminals 28 and 30 and the electro-optical properties of the material making up the cell.

Turning attention to the clockwise beam, it will be seen that rotator 24 causes the plane of polarization of the clockwise beam, which is shown by arrow 14b as it leaves reflector 14, to be rotated to a position at right angles to the optical axis of cell 26 as shown by arrow 24b. After leaving cell 26 with the polarization shown by arrow 26b in FIG. 2, the beam passes through rotator 22 which restores the polarization of the beam to its original position as shown by arrow 22b.

As is well-known, the application of a potential between the electrodes 28 and 30 will cause the beam having a polarization parallel to the direction of the field to have a velocity through the cell which is different from the velocity of the beam having a polarization at right angles to the electric field. This difference in velocity will result in a difference in effective path length of the two beams and hence in a difference in frequency between the clockwise beam and the counterclockwise beam. In a typical system having an optical loop of 300 centimeters and a nitrobenzene Kerr cell of 4 centimeter length with a .5 centimeter spacing between the electrodes, an applied voltage of 3 kilovolts will result in a difference in frequency of the two beams of the order of 3.5 megacycles. The maximum spacing between the two frequencies which can be supported by the system is determined by the Doppler bandwidth of the laser transmitter (approximately 900 megacycles for the 1.15μ He-Ne line). It will be recognized that the 3 kilovolts biasing potential is readily obtainable from the anode of the final power amplifier in source 32.

It is also known that changes in the potential applied to a Kerr cell and similar electro-optic devices will have a much greater effect on the velocity of the beam having a polarization parallel to its electric field than it has on the velocity of the beam having a polarization perpendicular to the electric field. Thus frequency modulation of the counterclockwise beam may be obtained without appreciable frequency modulation of the clockwise beam by amplitude modulation of the potential applied between the two electrodes 28 and 30. This amplitude modulation may take the form of an audio or video frequency signal supplied by source 32. It can be shown that, for the parameters mentioned above, a change in frequency of the counterclockwise beam of the order of 50 kilocycles may be obtained by an AC signal input having a peak-to-peak amplitude voltage of the order of 20 volts.

If a Kerr cell is employed as the modulating means the difference in frequency of the two beams is proportional to the square of the voltage applied between electrodes 28 and 30. Therefore large deviations in frequency may be obtained with only moderate increases in the bias voltage or in the amplitude of the modulation component.

If the AC modulation component is small compared to the DC biasing component, the difference signal between the two beams will be similar to an FM signal. This difference signal may be recovered by heterodyning the two beams in a photomixer, the unmodulated beam acting as the "local oscillator" signal. The resulting beat note is relatively independent of noise signals resulting from vibrations of the system of FIG. 1 since such vibrations will affect both beams equally. Partially transmissive reflector 14 and reflector 34 comprise means for directing energy from the two contra-rotating beams along a common optical path 36. A small fraction, i.e. approximately 5%, of the energy in the counterclockwise beam will pass directly to path 36 through reflector 14. A similar small fraction of the energy of the clockwise beam will pass through reflector 14 and strike reflector 34. Reflector 34 is oriented perpendicular to the incident beam and hence returns the energy along the path of incidence. Since reflector 14 is only slightly transmissive, most of the energy returned by reflector 34 will be redirected by reflector 14 along path 36.

It will be recognized that the system described in FIG. 1 may be employed as a communications system. In such a system signal source 32 may provide a voice or video modulated signal to electrodes 28 and 30. The transmitted beams along path 36 will be directed to a remote receiver. At the receiver, represented diagrammatically in FIG. 1 by photomixer 48, the photomixer 48 will derive from the heterodyning of the two laser beams a signal having a frequency equal to the beat frequency between the two beams. This beat fresuency signal will carry the frequency modulation of the counterclockwise beam. The modulation component of this beat frequency signal may be recovered in a suitable frequency discriminator.

If control of the difference between the average frequencies of the two contra-rotating beams is required without altering the anode supply potential of source 32, separate AC and DC inputs to electrodes 28 and 30 may be provided as shown in FIGURE 1A. Parts in FIGURE 1A corresponding to like parts in FIGURE 1 have been identified by the same reference numerals. In the circuit of FIGURE 1A, capacitor 50 blocks the DC component from source 32 while coupling the AC component to electrode 28. Bias source 52 provides a DC bias potential of any desired amplitude. Choke 54 blocks the modulating signal from source 32. Automatic control of the difference in frequency between the two beams, and hence the intercarrier beat frequency at the receiver, may be achieved by sampling the two beams at the output path 36, detecting the beat signal beam means of a photomixer, passing the beat frequency signal to a discriminator and using the DC output of the discriminator to control the amplitude of bais potiential supplied by source 52.

While the embodiment shown in FIG. 1 employs 3 reflectors defining a substantially equilateral optical loop, it is to be understood that other positions of the reflectors and a greater number of reflectors may be employed instead to form a closed optical loop. It is not necessary that the loop have the shape of a regulator polygon.

Two laser tubes 16 and 18 have been shown in FIG. 1 in order to provide high gain within a small space. However, more or fewer laser tubes may be employed as long as sufficient loop gain is employed to maintain the two contra-rotating beams. Also it is not necessary that the laser tubes be disposed in separate paths between different pairs of reflectors or in paths separate from the modulating elements 22, 24 and 26.

While the laser devices have been described as C.W. devices, similar operation may be achieved using pulsed lasers. In this case, cell 26 may alter the relative frequencies of the two beams from pulse to pulse.

The electro-optic device 26 may be replaced by means such as a Faraday cell in which birefringence is induced or changed by a magnetic field rather than an electric field. If this substitution is made, electrodes 28 and 30 would be replaced by a suitable magnetic coil about the cell. Cells employing stress-induced birefringence may be employed also to modulate the beam but such cells presently are not preferred because of the added complexity required to produce a stress representative of signal amplitude.

While there has been described what is at present considered to be the preferred embodiment of the present invention, it will be apparent that various modifications

What is claimed is:

1. A laser frequency modulation system comprising:
 a plurality of optical reflectors positioned to form a closed optical loop, first means disposed in said loop which, upon energization, causes two contra-rotating beams to circulate in said loop, the spatial positions of said reflectors determining the effective frequency of said beams,
 second means disposed in said loop and controllable by an applied signal for changing appreciably the effective frequency of said beam traveling in one direction around said loop while leaving substantially unchanged the effective frequency of said beam traveling in the opposite direction around said loop, and
 third means for causing energy derived from said two contra-rotating beams to exit from said loop along a common optical path.

2. A laser FM transmitter system comprising:
 a plurality of optical reflectors positioned to form a closed optical loop,
 a laser discharge device disposed in said optical loop, said device, upon energization, causing two contra-rotating light beams to circulate in said loop, the spatial positions of said reflectors determining the frequency of said light beams.
 first and second Faraday rotators positioned in said loop such that they are traversed by said light beams, said first rotor providing a rotation in a sence opposite to that provided by said second rotoator for a light beam traversing said lop in a given direction,
 an optical velocity modulating device positioned on said loop intermediate said Faraday rotators, said optical velocity modulating device having a light transmission characteristic for a light beam polarized in one plane which is differently affected by a signal supplied to said device than the light transmission characteristic for a light beam polarized in a different plane,
 means for supplying an information signal to said modulating device to control the velocity of light transmission through said device for light polarized in one of said planes, and
 means constructed and positioned to cause energy exiting from said optical loop and resulting from said light beams traveling in opposite directions in said loop to follow substantially coincident optical paths at points remote from said laser system.

3. A laser frequency modulation system comprising:
 a plurality of optical reflectors positioned to form a closed optical loop,
 a laser discharge device disposed in said optical loop, said device, upon energization, causing two contra-rotating light beams to circulate in said loop, the spatial positions of said reflectors determining the frequency of said light beams,
 first and second Faraday rotators positioned in said loop such that they are traversed by said beams, said first rotator providing a rotation in a sense opposite to that provided by said second rotator for a light beam traversing said loop in a given direction,
 an electro-optical cell positioned in said loop intermediate said Faraday rotators, said cell having a light transmission characteristic for a light beam polarized in one plane which is differently affected by a signal supplied to said cell than the light transmission characteristic for a light beam polarized in a different plane,
 means for supplying an information signal to said cell to control the velocity of light transmission through said cell for light polarized in one of said planes, and
 means constructed and positioned to cause energy exiting from said optical loop and resulting from said light beams traveling in opposite directions in said loop to follow substantially coincident optical paths at points remote from said laser system.

4. A laser frequency modulation system comprising:
 a plurality of optical reflectors positioned to form a closed optical loop,
 a laser discharge device disposed in said optical loop, said device, upon energization, causing two contra-rotating light beams to circulate in said loop, the spatial positions of said reflectors determining the frequency of said light beams,
 first and second Faraday rotators positioned in said loop such that they are traversed by said light beams, said first rotator providing a rotation in a sense opposite to that provided by said second rotator for a light beam traversing said loop in a given direction,
 an electro-optical cell positioned in said loop intermediate said Faraday rotators,
 means for supplying an information signal to said cell to control the velocity of light transmission through said cell for light polarized in one plane, and
 means constructed and positioned to cause energy exiting from said optical loop and resulting from said light beams traveling in opposite directions in said loop to follow substantially coincident optical paths at points remote from said laser system.

5. A laser frequency modulation system comprising:
 a plurality of optical reflectors positioned to form a closed optical loop, one of said reflectors being partially transmissive,
 a laser device disposed in said optical loop, said device, upon energization, causing two contra-rotating light beams to circulate in said loop, the spatial positions of said reflectors determining the frequency of said light beams,
 first and second Faraday rotators, each providing approximately 45° rotation, positioned in said loop to be traversed by said light beams traversing said loop, said first rotator providing a rotation in a sense opposite to that provided by said second rotator for a light beam traversing said loop in a given direction,
 a signal-controlled birefringent cell positioned in said loop intermediate said Faraday rotators,
 means for supplying an information signal to said cell, and
 an additional reflector spaced from said partially transmisive reflector, said additional reflector being positioned to intercept energy exiting through said partially transmissive reflector after having traversed said loop in a first direction and out of the path of energy exiting through said partially transmissive reflector after having traversed said loop in the opposite direction, said additional reflector being disposed perpendicular to the path of said intercepted energy.

6. A laser frequency modulation system comprising:
 a plurality of optical reflectors positioned to form a closed optical loop, one of said reflectors being partially transmissive,
 a laser device disposed in said optical loop, said device, upon energization, causing two contra-rotating light beams to circulate in said loop, the spatial positions of said reflectors determining the frequency of said light beams,
 first and second Faraday rotators, each providing approximately 45° rotation, positioned in said loop to be traversed by said light beams traversing said loop, said first rotator providing a rotation in a sense opposite to that provided by said second rotator for a light beam traversing said loop in a given direction,
 a Kerr cell positioned in said loop intermediate said Faraday rotators,
 means for supplying an information signal to said Kerr cell, and an additional reflector spaced from said partially transmissive reflector, said additional reflector being positioned to intercept energy exiting through said partially transmissive reflector after having traversed said loop in a first direction and out of the path of energy exiting through said partially transmissive reflector after having traversed said loop in the opposite direction, said additional reflector being disposed at right angles to the path of said intercepted energy.

7. A laser frequency modulation system comprising:
a plurality of optical reflectors positioned to form a closed optical loop, one of said reflectors being partially transmissive,
a gaseous laser discharge tube positioned with its longitudinal axis along the optical path between two of said reflectors, said device, upon energization, causing two contra-rotating light beams to circulate in said loop, the spatial positions of said reflectors determining the frequency of said light beams, first and second Faraday rotators, each providing approximately 45° rotation, positioned in said loop to be traversed by said light beams traversing said optical loop, said first rotator providing a rotation in a sense opposite to that provided by said second rotator for light traversing said loop in a given direction,
an electro-optic cell positioned in said loop intermediate said Faraday rotators,
means for supplying an information signal to said electro-optic cell, and
an additional reflector spaced from said partially transmissive reflector, said additional reflector being positioned to intercept energy exiting through said partially transmissive reflector after having traversed said loop in a first direction and out of the path of energy exiting through said partially transmissive reflector after having traversed said loop in the opposite direction, said additional reflector being positioned to reverse the direction of travel of said intercepted energy.

8. A laser frequency modulation system according to claim 7 wherein said laser discharge tube is located between a first pair of reflectors and said rotators and said electro-optical cell are located between a second pair of reflectors.

9. A laser frequency modulation system according to claim 8, said system further comprising a second gaseous laser discharge tube located between a third pair of reflectors.

10. A laser frequency modulation system comprising:
a plurality of optical reflectors positioned to form a closed optical loop, one of said reflectors being partially transmissive,
a gaseous laser discharge tube positioned with its longitudinal axis along the optical path between two of said reflectors, said device, upon energization, causing two contra-rotating light beams to circulate in said loop, the spatial positions of said reflectors determining the frequency of said light beams.
first and second Faraday rotators, each providing approximately 45° rotation, positioned in said loop to be traversed by said light beams traversing said loop, said first rotator providing a rotation in a sense opposite to that provided by said second rotator for a light beam traversing said loop in a given direction,
a Kerr cell positioned in said loop intermediate said Faraday rotators,
means for supplying an information signal to said Kerr cell, and
an additional reflector spaced from said partially transmissive reflector, said additional reflector being positioned to intercept energy exiting through said partially transmissive reflector after traversing said loop in a first direction and out of the path of energy exiting through said partially transmissive reflector after having traversed said loop in the opposite direction, said additional reflector being positioned to reverse the direction of travel of said intercepted energy.

11. A laser frequency modulation system according to claim 10 wherein said laser discharge tube is located between a first pair of reflectors and said rotators and said Kerr cell are located between a second pair of reflectors.

12. A laser frequency modulation system according to claim 11, said system further comprising a second gaseous laser discharge tube located between a third pair of refectors.

References Cited
UNITED STATES PATENTS

| | | | |
|---|---|---|---|
| 3,277,392 | 10/1966 | Nieolai. | |
| 3,323,411 | 6/1967 | Killpatrick | 331—94.5 XR |
| 3,239,670 | 3/1966 | Bloembergen | 250—199 |
| 3,327,243 | 6/1967 | Stickley | 250—199 XR |
| 3,333,206 | 7/1967 | Bret | 330—4.3 |

FOREIGN PATENTS 953,727  4/1964  Great Britain.

OTHER REFERENCES

James R. McDermott; Space and Aeronautics, Transmitters and Receivers for Optical Communications, June 1963, pp. 98–106.

P. Kaya: Proceedings of the IRE, Proposal for Modulating the Output of an Optical Maser, March 1962, p. 323.

ROBERT L. GRIFFIN, Primary Examiner

ALBERT J. MAYER, Assistant Examiner

U.S. Cl. X.R.

332—7.51